United States Patent [19]
Simms et al.

[11] Patent Number: 6,108,723
[45] Date of Patent: Aug. 22, 2000

[54] SYSTEM FOR IMPLEMENTING HARDWARE AUTOMATED CONTROL OF BURST MODE DATA TRANSFER OVER A COMMUNICATION LINK BETWEEN DEVICES OPERATING IN A BLOCK MODE

[75] Inventors: Mark J. Simms, Boise; R. Alexis Takasugi, Eagle, both of Id.

[73] Assignee: Hewlett-Packard Company, Palo Alto, Calif.

[21] Appl. No.: 09/119,164

[22] Filed: Jul. 20, 1998

[51] Int. Cl.[7] ........................................ G06F 13/00
[52] U.S. Cl. ................... 710/35; 710/33; 710/35; 708/655; 708/671
[58] Field of Search ................... 710/4, 20, 29, 710/33, 34, 35, 63, 106, 126, 129; 708/655, 671, 672

[56] References Cited

U.S. PATENT DOCUMENTS

| | | | |
|---|---|---|---|
| 4,722,069 | 1/1988 | Ikeda ....................................... | 708/656 |
| 4,989,173 | 1/1991 | Kaneda ................................... | 708/653 |
| 5,128,891 | 7/1992 | Lynch et al. ............................ | 708/656 |
| 5,179,663 | 1/1993 | Iimura ..................................... | 710/35 |
| 5,185,694 | 2/1993 | Edenfield et al. ..................... | 395/425 |
| 5,550,987 | 8/1996 | Tanaka .................................... | 395/286 |
| 5,691,719 | 11/1997 | Wakimoto ............................. | 341/141 |
| 5,710,800 | 1/1998 | Ito .......................................... | 375/370 |
| 5,717,949 | 2/1998 | Ito .......................................... | 395/824 |
| 5,809,260 | 9/1998 | Bredin .................................... | 710/128 |

OTHER PUBLICATIONS

Universal Serial Bus Specification, Revision 1.0, Chapter 5, pp. 39–83, Jan. 15, 1996.

Primary Examiner—Thomas C. Lee
Assistant Examiner—Chun Cao

[57] ABSTRACT

Burst-mode data transfers between a SCSI host bus adapter and at least one SCSI bus device interface adapter are implemented by hardware. For a first embodiment of the invention, the device interface adapter is equipped with a first, second and third data registers, a comparator, a subtractor, and control logic in the form of an application specific integrated circuit. When a burst-mode transfer is requested, the first register is programmed with a value corresponding to the length of the transfer in bytes, and the second register is programmed with the maximum possible number of bytes in a burst. The comparator then compares the value in stored in the first register with the value stored in the second register and determines which is the smaller. The smaller of the two values is written to the third register. The subtractor then subtracts said third value from said first value to obtain a remainder value. The first value is then replaced with a new first value equal to said remainder value. The control logic orchestrates the steps of comparing said first and second values, storing the smaller of said first and second values in said third register, subtracting said third value from said first value to give a remainder value, replacing said first value with a new first value equal to said remainder value, and causing the steps of comparing, storing, subtracting and replacing to be repeated until said third value is equal to zero. Initial loading of the first and second registers is performed by either the control logic or by a microprocessor. For an alternate embodiment of the invention, the control logic, the comparator and the subtractor are replaced by a microprocessor.

20 Claims, 4 Drawing Sheets

SYSTEM FOR IMPLEMENTING HARDWARE AUTOMATED CONTROL OF BURST MODE DATA TRANSFER OVER A COMMUNICATION LINK BETWEEN DEVICES OPERATING IN A BLOCK MODE

FIELD OF THE INVENTION

This invention relates to burst-mode transfers over a communication link between devices operating in a block mode and, more particularly, to methods for controlling and automating such transfers.

BACKGROUND OF THE INVENTION

Few individuals have had a greater effect on the personal computer industry than Alan Shugart. Generally credited with inventing the floppy drive while working for IBM in the late 1960s, he later founded Shugart Associates for the purpose of developing and manufacturing floppy drives. In 1974, shortly after Mr. Shugart's departure from the company, Shugart Associates introduced the 5¼-inch mini-floppy diskette drive, which rapidly supplanted the earlier 8-inch floppy drives and eventually became the standard floppy drives for the early PCS. The floppy interface developed by Shugart Associates was used by IBM in the original IBM PC, and is still the basis of all PC floppy drive interfaces. In 1979, Shugart and Finis Conner founded Seagate Technology. By the end of the year, Seagate had introduced the 5-megabyte ST-506 drive, which is now recognized as the father of all PC hard disk drives. This was followed by the 10-megabyte ST-412 drive, which IBM adopted for the original XT personal computer. The ST-506/412 interface developed by Seagate was the de facto hard disk interface standard for many years, and served as the basis for the ESDI and IDE interfaces as well.

Though Alan Shugart and the companies which he established are widely known for disk drive innovation, it is less well known that the Small Computer Systems Interface (SCSI) was created by Shugart Associates. Originally called the Shugart Associates System Interface (SASI), it received its present name when formally approved by the ANSI committee in 1986. A revised SCSI-2 standard was approved by the same committee in 1994, and a still newer revision called SCSI-3 is under development. The SCSI interface is not a device-level interface, but a systems-level interface. The SCSI standard defines the physical and electrical parameters of a parallel I/O bus used to connect computers and peripheral devices in daisy-chain fashion. The standard supports devices such as hard disk drives, tape drives, ZIP drives, CD-ROM drives, graphics scanners and other peripheral devices. The original SCSI bus standard supports as many as eight physical devices, which are usually called SCSI IDs. The newer SCSI-2 bus standard, on the other hand, supports as many as sixteen devices. For either standard, a host adapter which counts as one of the physical devices, functions as the gateway between the SCSI bus and the personal computer system bus. The SCSI bus itself does not talk directly with devices connected thereto, but instead communicates with a controller that front-ends each device. The host adapter is either plugged into or integrated into the system bus. Most personal computer systems support up to four host adapters, each of which under the original SCSI standard may be connected to a total of seven peripheral devices, for a total of 28 peripheral devices. For SCSI-2 implementations, a total of 4×15, or 60, peripheral devices may be coupled to the system bus.

By providing no expansion slots in the early Macintosh computers Apple Computer retained total control over system configuration, architecture and upgrades. As a result, most corporations ignored Apple's offerings. As an inexpensive way out of this bind, Apple added expandability to its closed Macintosh system by incorporating a SCSI port in the Mac Plus system. Peripheral devices could then be interfaced to its slotless Macs.

SCSI was slow to catch on in the world of IBM and IBM-compatible PCS because those systems have always been expandable. With eight bus slots supporting different devices and controllers, it seemed that SCSI was not needed. However, because of the great expandability SCSI offers, and because of the availability of hundreds of devices with built-in SCSI controllers, it has rapidly gained popularity in that arena. The primary advantage of expansion via SCSI in a PC system is the capability to chain a string of peripherals from a single adapter card, thus saving card slots inside the PC and limiting the proliferation of IRQs, DMAs and I/O memory addresses.

One problem with the original SCSI-1 standard was that many of the commands and features were optional. Thus, there was no assurance that a particular peripheral would support the expected commands. As a result of this problem, the SCSI-2 standard defines a set of 18 basic SCSI commands called the Common Command Set (CCS), which became the minimum set of commands supports by all peripherals. In addition to formal support for CCS, SCSI-2 provided additional definitions for commands to access CD-ROM drives (and their audio capabilities), tape drives, removable drives, optical drives, and several other peripherals. In addition, an optional higher speed called Fast SCSI-2 and a 16-bit version called Wide SCSI-2 were defined. Another feature of SCSI-2 is command queuing, which enables a device to accept multiple commands and execute them in the order that the device deems most efficient. This feature is most beneficial for multi-tasking operating systems which can send several requests on the SCSI bus at the same time.

Each data transfer on a SCSI bus is checked for parity errors. Thus, an 8-bit SCSI bus includes a ninth parity bit, while a 16-bit SCSI bus includes an additional two parity bits. In addition to the nine or eighteen data signal lines, a SCSI bus also includes multiple lines for ground, one for terminal power, and one line each for the signals ATN, BSY, ACK, RST, MSG, SEL, C/D, REQ and I/O. As multiple physical devices may share the SCSI bus, data is transferred in bursts so that the communication path may be used more efficiently. A maximum burst length is defined. However, not all data transfers are multiples of the burst length. That is, an entire data transfer may be less than the burst length or it may fall between multiples of the burst length. Originally, if a data transfer over the SCSI bus failed a parity check, an error message was generated, indicating that the data transfer had failed. Depending on the operating system, such a situation would, at best, require a repeat of the operation for which the data transfer had failed or, at worst, result in a system crash requiring a reboot with loss of data. In order to avoid such results, data transfers over SCSI buses are now generally managed by software routines which keep track of the number of bursts in each transfer, the size of less-than-full bursts or the filling of incomplete bursts with dummy bytes, the number of bursts successfully transferred and the resending of bursts received with parity errors. Though relatively successful in smoothing the transfer of data on the SCSI bus, these software routines require system overhead, in addition to reducing data transfer speed over the SCSI bus.

What is needed is a hardware implementation for managing burst transfers over the SCSI bus. Hardware-managed transfers have the potential for greatly improving data transfer efficiency and speed.

SUMMARY OF THE INVENTION

The invention provides for automated hardware control of burst-mode transfers on a SCSI bus between a host bus adapter and a device server having a device interface adapter which incorporates the invention. The invention eliminates the need for software control of such transfers, thereby improving transfer speed. For a preferred embodiment of the invention, the device interface adapter is equipped with three data registers, a comparator, a subtractor, and clocked control logic. The control logic, which is preferably incorporated in an application-specific integrated circuit (ASIC), may include a state machine. The control logic controls not only the timing of logic operations on board the device interface adapter, but also the transfer of data between the device server and the host interface adapter over the SCSI bus. The first data register holds a value corresponding to the number of bytes remaining in the transfer. At the beginning of the transfer, the stored value corresponds to the total number of bytes of data to be transferred. The second data register holds a value corresponding to the maximum possible number of bytes in a burst. The third data register holds a value corresponding to the actual number of bytes to be transferred in the next burst When a transfer is requested of the device interface adapter by the host bus adapter, the first and second registers are loaded with values corresponding to the length of the transfer and the maximum burst length, respectively. Initial loading of the first and second registers may be handled by the ASIC, if such functionality is incorporated therein, or it may be handled by an optional microprocessor on board the device interface adapter which is separate from the ASIC. Once the first and second registers are loaded, the control logic orchestrates the following processing sequence with no further input from the microprocessor (if so equipped). The comparator compares the values stored in the first and second registers, determines which of the two values is the smaller, and outputs the smaller value, which is the actual burst length, into the third register. The subtractor then decrements the value in the first register by the value stored in the third register. The decremented value represents the bytes remaining in the transfer. The control logic then initiates a transfer of a burst of the length specified by the third register between the device server and the host bus adapter. Once the burst has been transferred successfully, the control logic checks to see if the value stored in the first register is zero. If it is zero, the transfer is complete and the routine is terminated. If it is not zero, the control logic cause the sequence to repeat until the value loaded in the first data register is zero. If an error occurs during the transfer of a burst, that burst may be repeated using the value stored in the third data register. All other aspects of data transfers on the SCSI bus, such as handshaking, are handled by the protocol of the SCSI bus. Automated control of burst transfers is only possible between the host bus adapter and devices having a device interface adapter which incorporates the invention. Control of burst mode data transfers between the host adapter and any other device on the same SCSI bus whose interface adapter does not incorporate the invention will be handled in accordance with the control method implemented by that particular that particular device interface adapter.

For an alternative, although somewhat slower, embodiment, a microprocessor replaces all or a portion of the specialized control logic. The microprocessor and its associated clock may control the timing of logic operations on board the device interface adapter, the transfer of data between the device server and the host interface adapter over the SCSI bus, the initial loading of the first and second registers, and if so desired, may even replace the comparator and subtractor. The basic process remains the same. However, because of the non-specialized nature of a microprocessor, a greater number of clock cycles are required to perform the same tasks, thus slowing transfer speed.

DETAILED DESCRIPTION OF THE INVENTION

As heretofore stated, the primary advantage of the SCSI bus is that it allows the addition of up to seven or fifteen peripheral devices (depending on whether the bus is SCSI-1 or SCSI-2) using a single host bus adapter which serves as the gateway to the host computer system. In the real world, the lack of prevailing standards results in multiple devices each being interfaced to a host system via its own specialized host bus adapter card which is plugged into the system bus. Because each host bus adapter card requires its own system interrupt (IRQ) allocation, one of the primary benefits of using the SCSI bus is lost. This situation is gradually changing as dominant companies in the PC industry set standards which smaller companies will ultimately follow. For the time being, however, the lack of standards affects the implementation of the present invention. Generally speaking, control of burst-mode transfers is implemented at the device level. That is to say that burst-mode transfer control is managed by the device interface adapter associated with a particular device. The present invention provides for automated hardware control of burst-mode transfers on a SCSI bus between a host bus adapter and a device server having a device interface adapter which incorporates the invention. The invention eliminates the need for software control of such transfers, thereby improving transfer speed.

Figure 1:
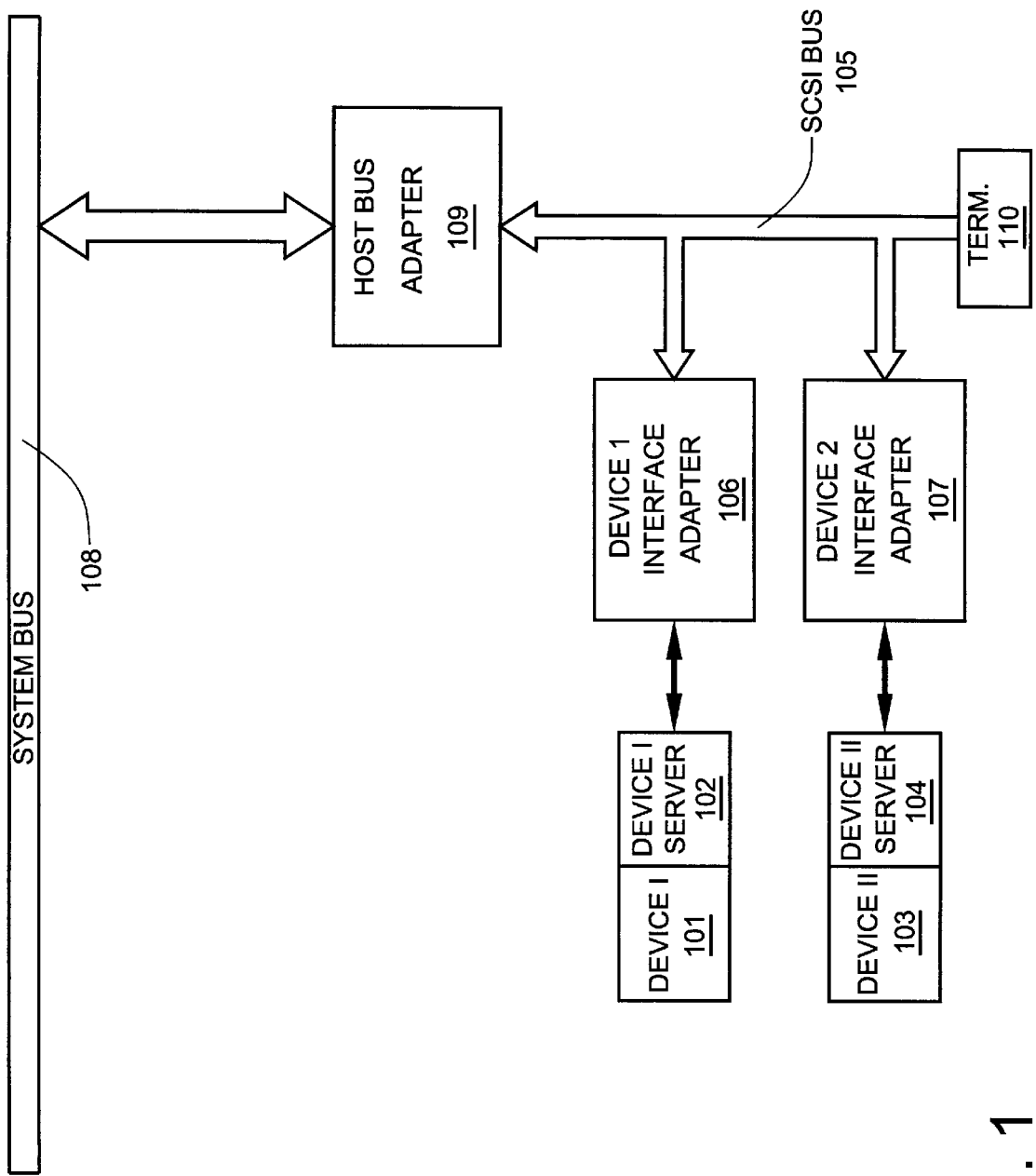
FIG. 1 is a block diagram of a first embodiment of a SCSI bus having a host bus adapter and a device I interface adapter which incorporates the invention.

Referring now to FIG. 1, a first peripheral device 101 having a device server 102 and a second peripheral 103 having a device server 104 are coupled to a SCSI bus 105 via a first device interface adapter 106 and a second device interface adapter 107, respectively. The SCSI bus 105 is interfaced to a host computer system bus 108 via a host bus adapter 109. The first and second peripheral devices, 101 and 103 respectively, may be associated with any one of a number of devices such as a hard disk drive, a tape drive, a ZIP drive, a CD-ROM drive, a graphics scanner, or any other device having a device interface adapter designed to function with the host bus adapter 109. The total number of peripheral devices which may be interfaced to the host computer system bus 108 via host bus adapter 109 depends on the SCSI version. A bus terminator 110 prevents unwanted signal reflections at the end of the SCSI bus 105 after the last peripheral device installed on the SCSI bus 105. The first device interface adapter 106, which incorporates a preferred embodiment of the invention, is disclosed in more detail in FIG. 2.

Figure 2:
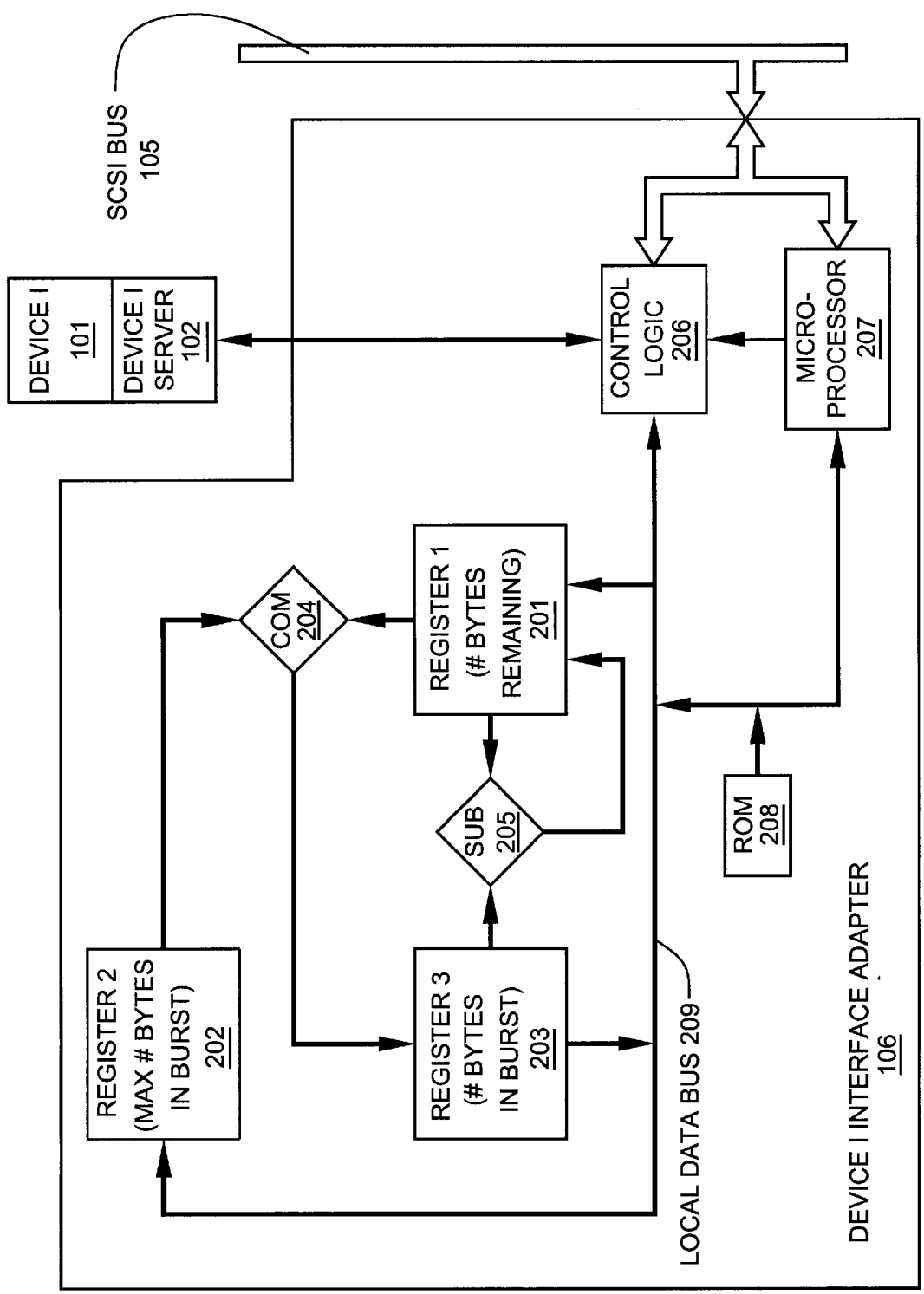
FIG. 2 is a block diagram of the device I interface adapter of FIG. 1, which incorporates the invention.

Referring now to FIG. 2, the first device interface adapter 106 incorporates a first data register 201, a second data register 202, a third data register 203, a comparator 204, a subtractor 205, clocked control logic 206, a microprocessor 207, and a programmable read-only memory (PROM) 208. The control logic 206, which is preferably incorporated in an application-specific integrated circuit (ASIC), may include a state machine. The control logic 206 controls not only the timing of logic operations on board the device interface adapter 106, but also the transfer of data between the first device server 102 and the host interface adapter 109 (see FIG. 1) over the SCSI bus 105. The first data register 201 holds a value corresponding to the number of bytes remaining in the transfer. The size of the transfer may be any number of bytes in length, and may be less than, greater than, or equal to the size of a record (as defined by the host computer system). At this level of system operation, transfers are made with no regard to record size. At the beginning of the transfer, the value stored in the first data register 201 corresponds to the total number of bytes of data to be transferred. The second data register 202 holds a value corresponding to the maximum possible number of bytes in a burst. The third data register 203 holds a value corresponding to the actual number of bytes to be transferred in the next burst between the device server 102 and the host bus adapter 109 (see FIG. 1).

Still referring to FIG. 2, when a transfer is requested of the device interface adapter 106 by the host bus adapter 109, the first data register 201 and the second data register 202 are loaded with values corresponding to the transfer length and the maximum burst length, respectively. Initial loading of the first and second data registers may be handled by the control logic 206, if such functionality is incorporated therein, or it may be handled by an optional microprocessor 207 on board the device interface adapter 106 which is separate from the control logic 206. If a microprocessor 207 is utilized for loading the initial data values, a read-only memory (ROM) is used to program the microprocessor 207 when a power-up sequence is detected. Once the first data register 201 and the second data register 202 are loaded with the appropriate values, the control logic 206 orchestrates the following processing sequence with no further input from the microprocessor (if so equipped). The comparator 204 compares the value stored in the first data register 201 with the value stored in the second data register 202, determines which of the two values is the smaller, and outputs the smaller value, which is the actual length in bytes of the next burst, into the third register 203. The subtractor then decrements the value in the first register 201 by the value stored in the third register 203. The decremented value represents the bytes remaining in the transfer. The control logic 207 then initiates a transfer of a burst of data between the first device server 102 and the host bus adapter 109. Once again, the number of bytes in the burst is specified by the value stored in the third register 203. Once the burst has been transferred successfully, the control logic repeats the sequence. The process is repeated until the entire transfer has been successfully completed and the value in the first data register 201 is zero. If an error occurs during the transfer of a burst, that burst may be repeated using the value stored in the third data register 203. All other aspects of data transfers on the SCSI bus, such as handshaking, are handled by the protocol of the SCSI bus. Automated control of burst transfers is only possible between the host bus adapter 109 and devices having a device interface adapter 106 which incorporates the invention. Control of burst mode data transfers between the host bus adapter 109 and any other device server such as device 11 103 on the same SCSI bus whose interface adapter 107 does not incorporate the invention will be handled in accordance with the control method implemented by that particular that particular device interface adapter.

Figure 3:
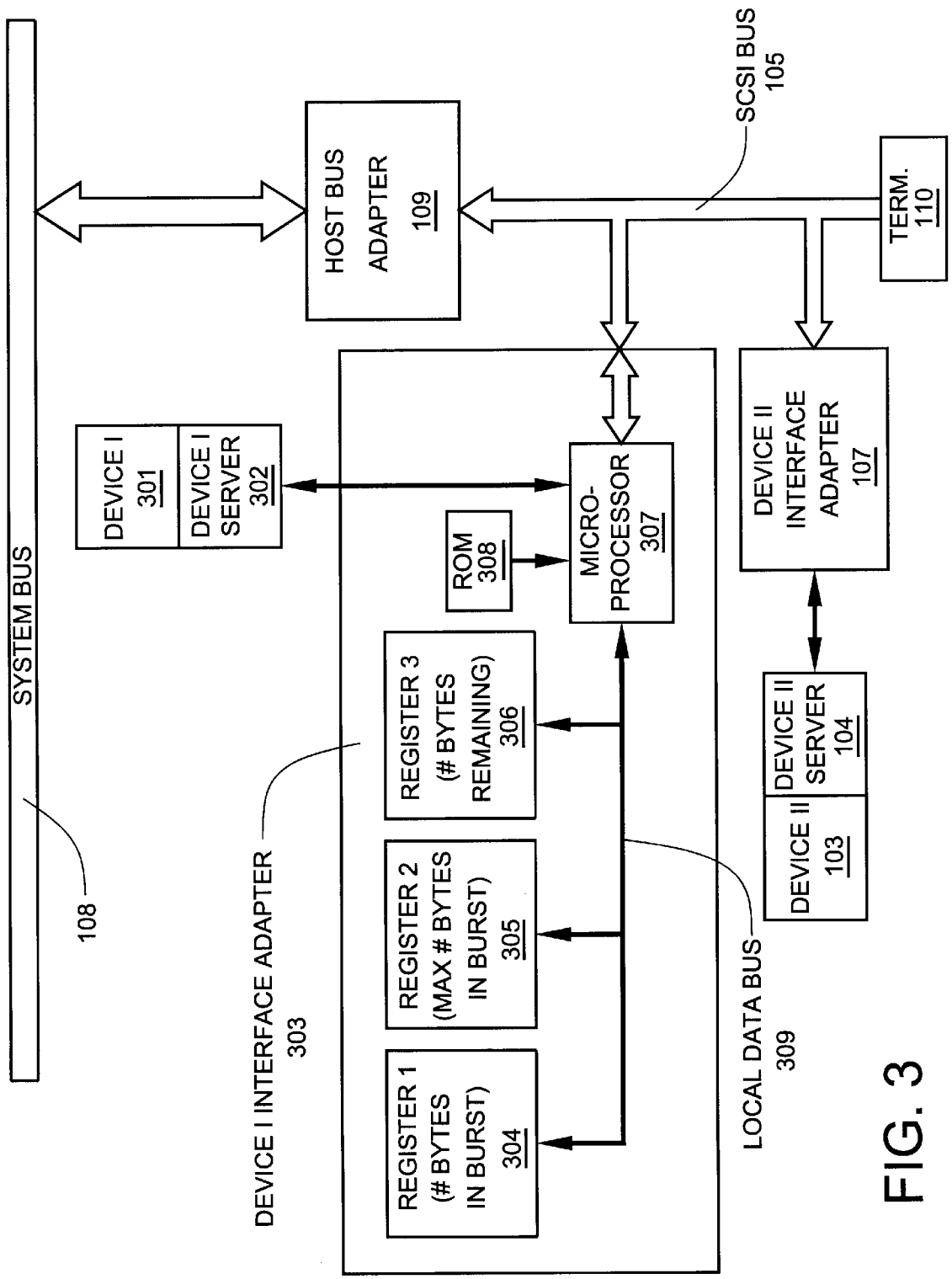
FIG. 3 is a block diagram of a second embodiment of a SCSI bus having a host bus adapter and a device I interface adapter which incorporates the invention.

Referring now to FIG. 3, a first peripheral device 301 having a device server 302 is interfaced to a SCSI bus 105 via a device interface adapter 303 which incorporates an alternate embodiment of the invention. A second peripheral device server 104 is interfaced to the SCSI bus 105 via a conventional device interface adapter 107 which does not incorporate the invention. The SCSI bus 105 is interfaced to a host computer system bus 108 via a host bus adapter 109. The first device interface adapter 303 has associated therewith a microprocessor 307, a read-only memory (ROM) 308 in which is stored program code for managing burst transfers, a first data register 304, a second data register 305, and a third data register 306. A local data bus 309 connects the microprocessor 307 to data registers 304, 305 and 306. The first and second peripheral devices, 301 and 103 respectively, may be any one of a number of devices such as a hard disk drive, a tape drive, a ZIP drive, a CD-ROM drive, a graphics scanner. The total number of peripheral devices which may be interfaced to the host computer system bus 108 via host interface controller 109 depends on the SCSI version. A bus terminator 110 prevents unwanted signal reflections at the end of the bus after the last device. The burst-mode transfer control for the first peripheral device 301 is implemented in a manner similar to that of the preferred embodiment of the invention. The primary difference is that register loading, compare, and decrement functions are handled by the microprocessor 307 rather than the specialized control logic 206. The values stored in the first, second and third data registers (304, 305 and 306, respectively) of this alternative embodiment correspond to the values stored in the first, second and third data registers (201, 202 and 203, respectively) of the preferred embodiment depicted in FIGS. 1 and 2.

Figure 4:
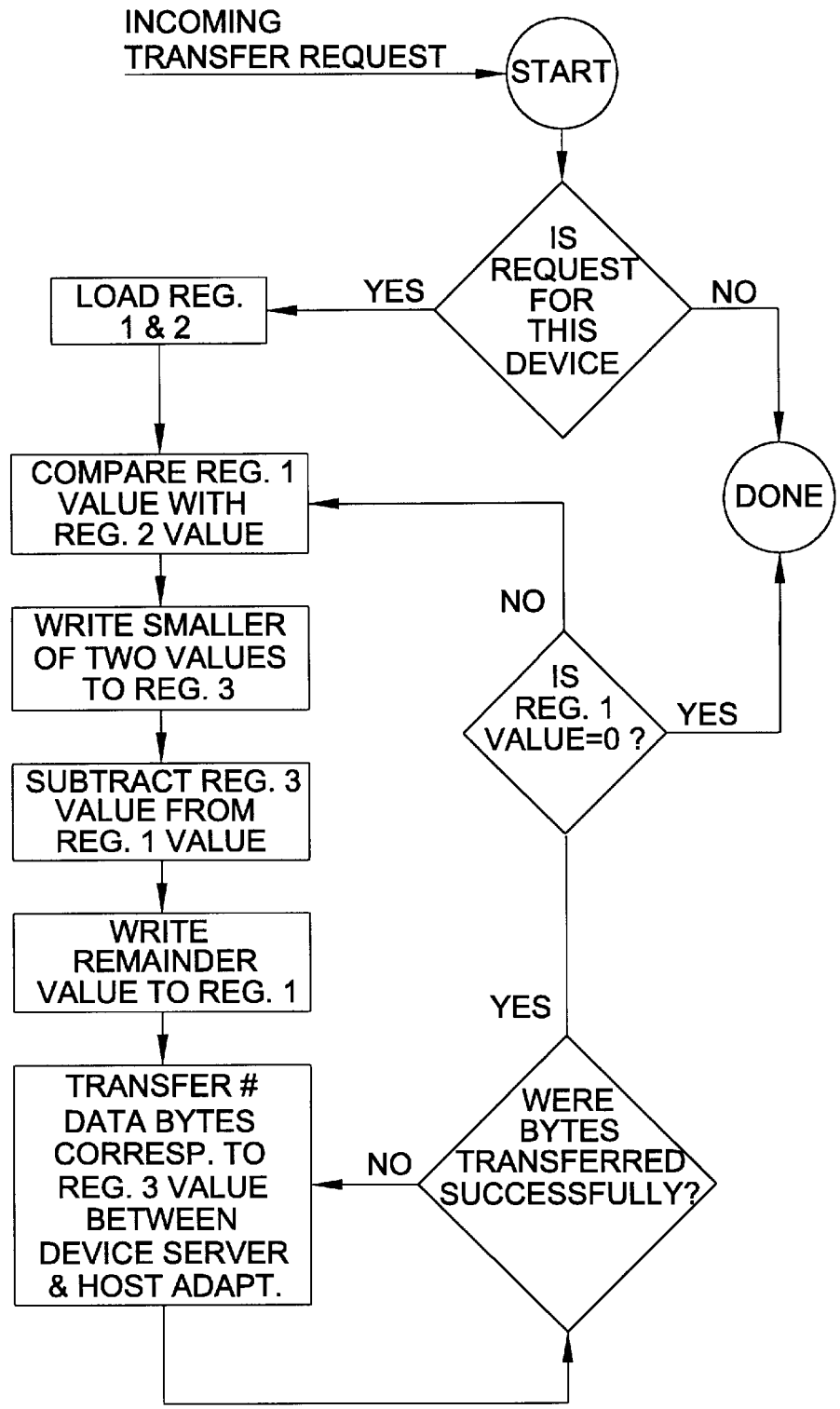
FIG. 4 is a logic diagram of the process for controlling burst transfers.

Referring now to FIG. 4, automated hardware control of burst-mode transfers may be characterized as a hardware-implemented process. For the preferred embodiment of the invention shown in FIGS. 1 and 2, the process begins at "START" with the control logic 206 waiting for the receipt of a transfer request. Upon receipt of such a request, the request is decoded to discern whether or not the request applies to the device with which the interface adapter incorporating the invention is associated. If the request does not apply to the device having the interface adapter which incorporates the invention, no further action is taken. However, if it is determined that the request is indeed directed at the device fronted by interface adapter 106, the first and second registers 201 and 202 are loaded by the control logic 206 (or the microprocessor 207) with the appropriate values. The first register 201 is loaded with a value corresponding to the total number of bytes in the transfer, while the second register 202 is loaded with a value corresponding to the maximum number of bytes in a burst. The smaller of these two values is then written to the third register 203. Subtractor 205 then decrements the value stored in the first register 201 by the value stored in the third register 203. A burst data transfer is then performed between the device server 102 and host bus adapter 109, with the number of bytes being transferred corresponding to the value stored in the third register 203. Control logic 206 then checks to see whether or not the bytes were transferred successfully. If not, the burst transfer is repeated using the data value that is still stored in the third register 203. If the transfer was completed successfully, the value stored in the first register 201 is checked to see if it is zero. If a zero is found in this register, a completed transfer is indicated, and the routine is ended. A non-zero value in register 201 indicates that the transfer is not yet complete. Thus, comparator 204 again compares the value stored in the first register 201 with the value stored in the second register 202, writes the smaller of the two values to the third register 203, subtracts the value in third register 203 from the value in the first register value 201, writes the remainder value to the first register 201, and transfers the number of data bytes corresponding to the value stored in the third register 203 between the device server 102 and the host adapter 109. The process continues repeatedly until the value in the first register 102 is zero.

For the alternative embodiment of the invention, the process begins at "START" with the microprocessor 307 waiting for the receipt of a transfer request. Upon receipt of such a request, the request is decoded to discern whether or not the request applies to the device with which the interface adapter incorporating the invention is associated. If it is determined that the request is indeed directed at the device fronted by device I interface adapter 303, the first and second registers (304 and 305, respectively) are loaded by the microprocessor 307 with the appropriate values. The first register 304 is loaded with a value corresponding to the total number of bytes in the transfer, while the second register 305 is loaded with a value corresponding to the maximum number of bytes in a burst. Microprocessor 307 then compares the values stored in first and second registers (304 and 305, respectively). Microprocessor 307 writes the smaller of these two values to the third register 306. Microprocessor 307 then decrements the value stored in the first register 304 by the value stored in the third register 306. A burst data transfer is then performed between the device server 302 and host bus adapter 109, with the number of bytes being transferred corresponding to the value stored in the third register 306. Microprocessor 307 then checks to see whether or not the transfer was completed successfully. If not, the burst transfer is repeated using the data value that is still stored in the third register 306. If the transfer was completed successfully, the value in the first register 304 is checked in order to determine whether the value stored is zero. If so, the routine terminates. If it is not zero, the logic flow returns to a comparison of the values in the first and second registers (304 and 305, respectively). The process continues until the value in the first register is zero, which signifies that the transfer is complete.

Although only two embodiments of the invention are described herein, it will be obvious to those having ordinary skill in the art that changes and modifications may be made to the invention without departing from the spirit and scope of the invention as hereinafter claimed. For example, although the invention is disclosed in terms of a SCSI bus, the invention is applicable to any other type of bus or, generally, any communication link over which burst-mode transfers are implemented. In addition, the values stored in the data registers 201, 202, 203, 304, 305 and 306 may represent bytes or any other length of data unit, such as 16-bit double-bytes, 32-bit words or 64-bit long words. In other words, burst transfers, instead of being quantified in terms of 8-bit bytes, may be quantified by any other appropriate multiple-bit unit.

What is claimed is:

1. A method for implementing automated control of burst-mode transfers of a data record between a transmitting controller and a receiving controller over a communication link, the method comprising the steps of:

(a) providing first, second and third data registers;

(b) storing a value in the first data register corresponding to the total length of the transfer in data units;

(c) storing a value in the second data register corresponding to the maximum possible number of data units in a burst;

(d) comparing the value stored in the first data register with the value stored in the second data register, thereby determining which of the two values is the smaller value;

(e) storing said smaller value, which is the actual burst length, to the third register;

(f) subtracting the value stored in the third register from the value stored in the first data register to provide a remainder value which represents the total number of data units remaining in the transfer;

(g) replacing the value stored in the first register with the remainder value;

(h) transferring the amount of data represented by the value stored in the third register from the transmitting controller to the receiving controller; and (i) repeating steps (d) through (h) until the value in the first data register is zero.

2. The method of claim 1, wherein said first and second registers are programmed when a transfer request is received.

3. The method of claim 1, wherein said data units are 8-bit bytes.

4. The method of claim 1, which further comprises the step of providing control logic which manages the steps of storing, comparing, subtracting, replacing, and transferring.

5. The method of claim 4, wherein said control logic is incorporated in an application specific integrated circuit.

6. The method of claim 4, which further comprises the step of providing a comparator for performing the step of comparing, and a subtractor for performing the step of subtracting.

7. The method of claim 1, which further comprises the step of providing a microprocessor and a local data bus interconnecting the microprocessor with the first, second and third data registers for performing the steps of storing, comparing, subtracting, replacing, and transferring.

8. The method of claim 7, which further comprises the step of providing a read-only memory in which is stored program code readable by said microprocessor; said program code managing the steps of storing, comparing, subtracting, replacing, and transferring.

9. The method of claim 1, wherein burst-mode transfers are between a between the host bus adapter and a device interface adapter.

10. The method of claim 9, wherein said communication bus is a SCSI bus.

11. The method of claim 9, wherein said data registers, said microprocessor, said local data bus, and said read-only memory are on board the device interface adapter.

12. The method of claim 9, wherein each device interface adapter on the bus has its own microprocessor, first, second and third data registers, read-only memory and local data bus for controlling burst-mode transfers between that device interface adapter and the host bus adapter.

13. In combination with a SCSI bus coupled to a host system bus via a host bus adapter, a device interface adapter which couples the SCSI bus to at least one peripheral device, and which implements hardware-automated control of burst-mode transfers over the SCSI bus, said device interface adapter comprising:

(a) a first data register for storing a first value which represents the total number of data units remaining in a each burst-mode data transfer;

(b) a second data register for storing a second value which represents the maximum size of a burst in data units;

(c) a third data register for storing a third value which represents the actual size of the next burst to be transferred;

(d) a read-only memory for storing program code for managing burst-mode transfers;

(e) a microprocessor for performing the steps of storing said first and second values at the start of a burst-mode transfer, comparing said first and second values, storing the smaller of said first and second values in said third register, subtracting said third value from said first value to give a remainder value, replacing said first value with a new first value equal to said remainder value, and repeating the steps of comparing, storing, subtracting and replacing until said third value is equal to zero, said microprocessor coupled to said SCSI bus and to said first, second and third registers.

14. The host interface adapter of claim 13, wherein said data units are 8-bit bytes.

15. The host interface adapter of claim 13, wherein said microprocessor is coupled to said first, second and third data registers via a local data bus.

16. In combination with a SCSI bus coupled to a host system bus via a host bus adapter, a device interface adapter which couples the SCSI bus to at least one peripheral device, and which implements hardware-automated control of burst-mode transfers over the SCSI bus, said device interface adapter comprising:

(a) a first data register for storing a first value which represents the total number of data units remaining in a each burst-mode data transfer;

(b) a second data register for storing a second value which represents the maximum size of a burst in data units;

(c) a third data register;

(d) a comparator for comparing said first and second values and writing a third value, which is the smaller of said first and second values, to said third register;

(e) a subtractor for subtracting said third value from said first value to obtain a remainder value, and replacing said first value with a new first value equal to said remainder value;

(f) control logic for orchestrating the steps of comparing said first and second values, storing the smaller of said first and second values in said third register, subtracting said third value from said first value to give a remainder value, replacing said first value with a new first value equal to said remainder value, and causing the steps of comparing, storing, subtracting and replacing to be repeated until said first value is equal to zero, said control logic coupled to said SCSI bus and to said first, second and third registers.

17. The device interface adapter of claim 16, wherein said control logic stores said first and second values in said first and second registers.

18. The device interface adapter of claim 16, which further comprises:

a microprocessor for loading an initial set of said first and second values in said first and second registers, respectively; and a local data bus which couples said microprocessor to said first and second registers.

19. The device interface adapter of claim 16, wherein said data units are eight-bit bytes.

20. The device interface adapter of claim 16, wherein said control logic is incorporated in an application specific integrated circuit.

* * * * *